United States Patent [19]

Kretschmer et al.

[11] Patent Number: 4,997,407
[45] Date of Patent: Mar. 5, 1991

[54] CENTERED DOUBLE JOINT WITH LUBRICATION

[75] Inventors: Horst Kretschmer, Cologne; Felix Mikeska, Siegburg, both of Fed. Rep. of Germany

[73] Assignee: Jean Walterscheid GmbH, Lohmar, Fed. Rep. of Germany

[21] Appl. No.: 537,322

[22] Filed: Jun. 13, 1990

[30] Foreign Application Priority Data

Jun. 29, 1989 [DE] Fed. Rep. of Germany ....... 3921242

[51] Int. Cl.⁵ ............................ F16D 3/26; F16D 3/16
[52] U.S. Cl. ........................................ 464/11; 464/118
[58] Field of Search ........................... 464/11, 117, 118

[56] References Cited

U.S. PATENT DOCUMENTS

| | | | |
|---|---|---|---|
| 1,949,859 | 3/1934 | Charles | 464/11 X |
| 1,979,768 | 11/1934 | Pearce | 464/11 X |
| 2,991,634 | 7/1961 | Daley, Jr. | 464/118 |
| 3,326,323 | 6/1967 | Delker | 464/14 X |
| 4,490,125 | 12/1984 | Konrad et al. | 464/11 |
| 4,781,662 | 11/1988 | Mayhew et al. | 464/118 X |

Primary Examiner—Thomas R. Hannon
Attorney, Agent, or Firm—Toren, McGeady & Associates

[57] ABSTRACT

A double joint provided with an arrangement for lubricating the centering devices which, via the lubricating nipple provided for a universal joint, may be supplied with lubricant. For this purpose, a hose is inserted centrally into the cross member into a threaded bore which communicates with the lubricating channels of the cross member. The hose extends into a lubricating channel in the centering device which is arranged so as to extend on the axis of the outer yoke of the universal joint. It supplies the centering device for the two universal joints, consisting of a sleeve and a journal, with lubricant. The flexible hose permits articulation of the outer yoke relative to the cross member without the hose leaving the lubricating channel. The articulation of the two parts relative to each other is accommodated by elastic deformation of the hose.

6 Claims, 3 Drawing Sheets

CENTERED DOUBLE JOINT WITH LUBRICATION

BACKGROUND OF THE INVENTION

The invention relates to a centered double joint with two universal joints each consisting of an inner yoke and an outer yoke and a cross member which connects the two and which, via bearings, is held in bores of the yokes. The two inner yokes are connected to each other and the two outer yokes, via engaging centering devices centrically attached to a bridge connecting their yoke arms, are guided either directly relative to each other or by inserting a guiding disc radially movable between the inner yokes. One of the centering devices being a sleeve and the other one a spherical journal guided therein, and the centering device associated with the bridge having a lubricating channel which for lubricating purposes is connected to the lubricating channels of the cross member.

With such an assembly, known from DE 31 42 930 C2, the cross member is associated with a slidable piston which for lubricating purposes has to be moved into a congruent position relative to the lubricating channel in the centering device and which establishes contact as a result of the pressure of the lubricant. A further embodiment proposes a lubricating position at maximum articulation, with the lubricating channels in the centering device and in the cross member having to be moved into congruent positions.

From DE 31 38 190 C2 is it known to provide the cross member with a central spherical recess into which an insert with a partially spherical outer face is inserted, with the other end of the insert closely resting against and being supported on the bridge comprising a lubricating channel.

With the first prior art solution, to effect lubrication, it is necessary to first find the right lubricating position to prevent the lubricant pressed into the cross member from escaping without reaching the lubricating regions of the centering device to be lubricated. With the second embodiment there exists a permanent connection, but in the region of the cross member a considerable amount of machining is necessary for providing the ball socket for the insert. The same applies to the supporting face on which the insert is supported on the bridge. Furthermore, to accommodate the ball socket, the cross member has to be weakened in its center.

SUMMARY OF THE INVENTION

Accordingly, it is an object of the present invention to provide simple means for lubricating the centering devices which effect a permanent connection, via which the lubricant pressed into the cross member reaches the centering region of the centering devices and which, furthermore, requires either no or only slight weakening or machining in the region of the cross member.

Pursuant to this object, and others which will become apparent hereafter, one aspect of the present invention resides in at least one of two cross members having a centrically arranged bore which opens towards the bridge and which is connected to the lubricating channels of the cross member. Additionally, the bridge and the centering device connected thereto are provided with a continuous lubricating channel arranged so as to extend on the axis of rotation of the respective outer yoke and connected to the bore of the cross member via a flexible hose.

This arrangement and design ensure that the central hole in the cross member, existing in any case, only needs to be guided through the two sides or, that the hole to be provided in any case is used for inserting and attaching the hose. In this way expensive machining operations are eliminated. The flexibility of the hose is used for bridging the position of the lubricating channels in the bridge and centering devices, which changes upon articulation. Nevertheless, this design achieves a constant connection so that dirt cannot penetrate from the outside and it is not necessary to find a certain position for lubricating purposes.

Needless to say, lubrication may also be effected via one of the lubricating nipples provided in one of the four bearing bushes.

According to a preferred embodiment of the invention, the hose is provided with a threaded attachment screwed into the threaded bore of a cross member. The screwed-in hose achieves a positive sealing connection with the cross member.

According to a further preferred embodiment, the hose is provided with a cylindrical attachment which is pressed into the threaded bore of the cross member. The pressed-in hose attachment permits an alternative method of connection with the cross member.

According to a special embodiment of the invention, the hose extends into the lubricating channel of the bridge and the lubricating channel is conically extended in the direction of the cross member.

In order to deflect the hose and transfer it into the respective changed position without causing any sharp bends, the hose should extend into the lubricating channel of the bridge and the lubricating channel should be conically extended in the direction of the cross member. The conical extension ensures a deflection of the hose without giving it any sharp bends.

According to a further embodiment of the invention, the hose is axially movable in the bore of the centering device and, after having been expanded by the pressure of the lubricant during lubrication, it rests outwardly sealingly against the bore.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
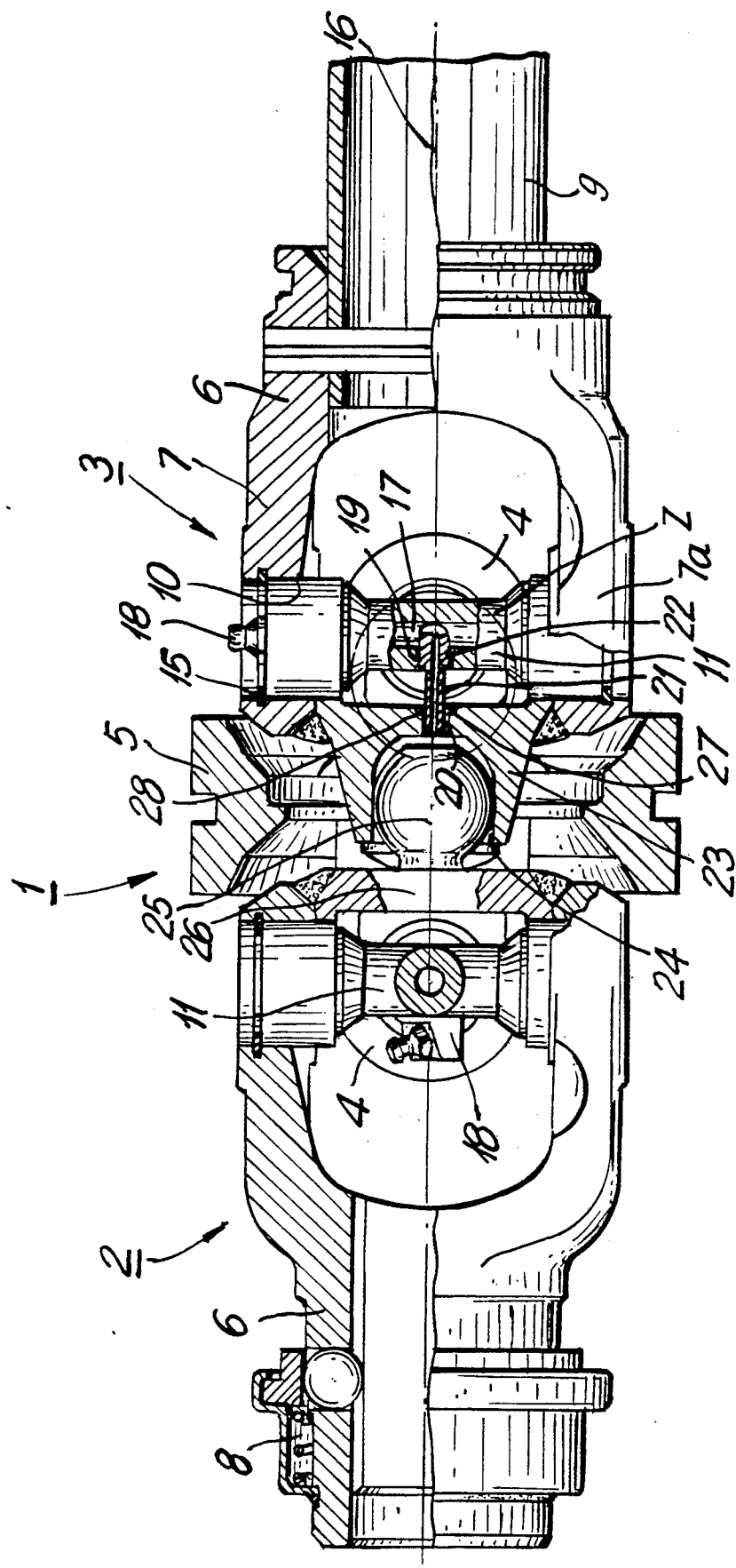
FIG. 1 shows a first embodiment of a double joint according to the invention, with the double joint being in an extended position.
Figure 2:
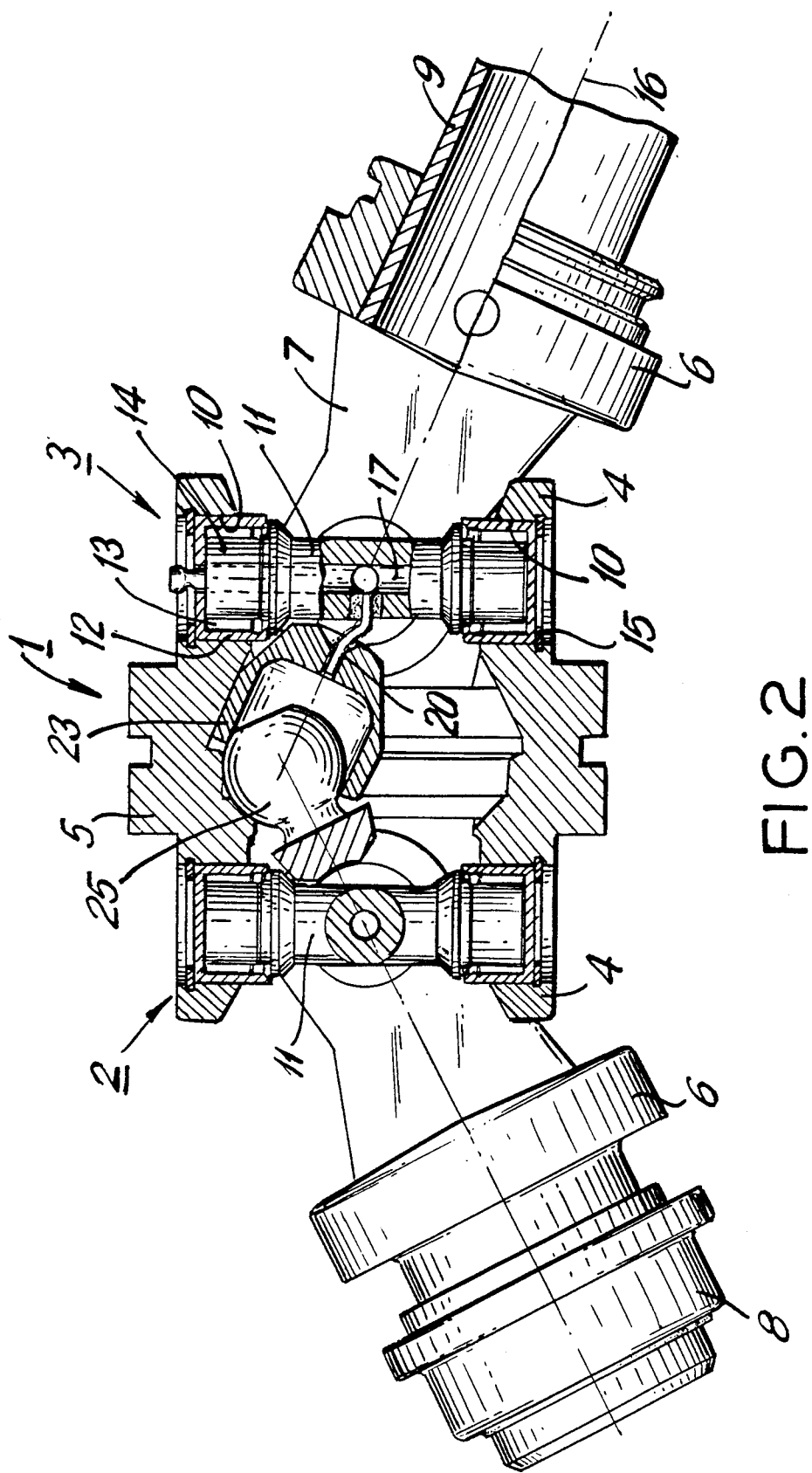
FIG. 2 shows the double joint according to FIG. 1, but in an articulated condition.
Figure 3:
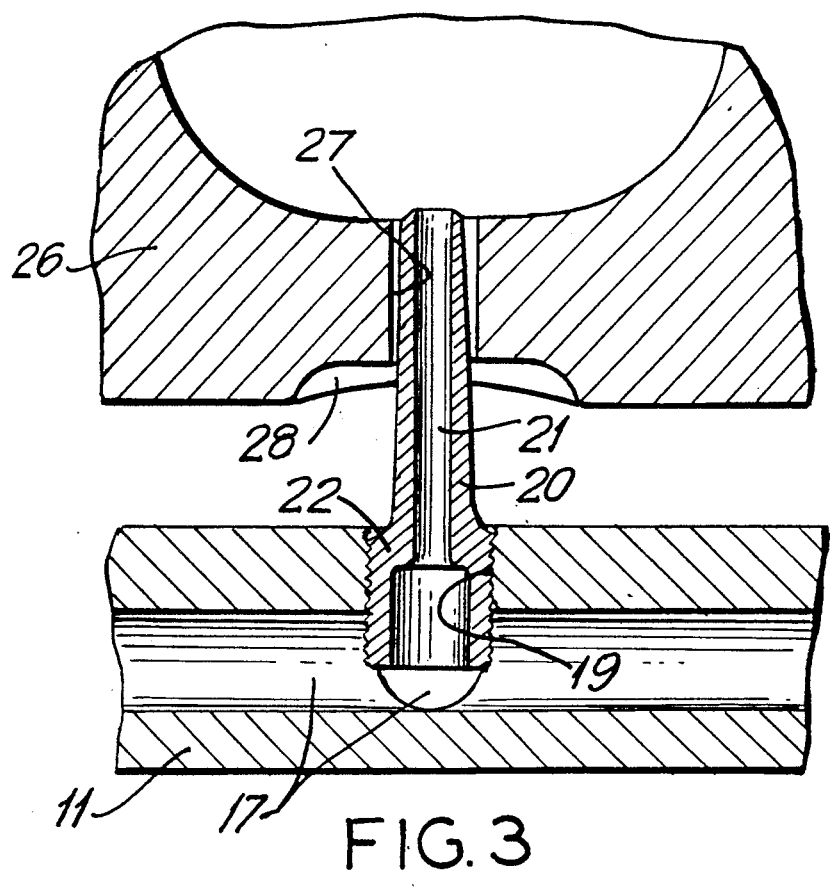
FIG. 3 is a detail Z according to FIG. 1.

The double joint 1 shown in FIGS. 1, 2 and 3 consists of two universal joints 2, 3 centered relative to each other. The two universal joints 2, 3 each comprise an inner yoke 4 and an outer yoke 6. The two inner yokes 4 are connected to each other via a connecting flange 5. They may also be designed to form one piece, for example.

One of the outer yokes 6 is provided, for example, with a high-speed connection 8 for attaching it to a driveshaft, and the other outer yoke 6 is provided with a tubular shaft 9 for passing on the torque to a further joint and subsequently to a unit to be driven. Such joints and driveshafts are preferably used for driving agricultural implements, with the driving movement branching off from the power take-off shaft of the tractor. For this purpose, the outer yoke 6 of the universal joint 2 is for instance attached via the high-speed connection 8 to the power take-off shaft of the tractor.

Each of the two universal joints 2, 3 also comprises a cross member 11 having four arms 14 arranged at right angles and in pairs positioned in one plane. In a preferred embodiment, all arms 14 are arranged in such a way that their axes are positioned in one plane. In each case, two arms 14 are supported in a bore of the inner yoke 4 and outer yoke respectively with bearing bushes 12, needles 13 being arranged therebetween. The bearing bushes 12 are fixed by a securing ring 15.

The connecting flange 5 is provided with a central recess, with centering devices 23, 25 passing through this recess. One of the centering devices is designed as a centering sleeve 23 and the other one as a spherical centering journal 25. The spherical centering journal 25 is guided with its outer contour in a bore 24 of the centering sleeve 23. The centering sleeve 23 and the centering journal 25 are each connected via bridges 26 to yoke arms 7, 7a of the respective outer yoke 6 of their universal joint 2 or 3. The connection is preferably produced in the form of a weld.

Both cross members 11 comprise lubricating channels 17 and a lubricating nipple 18 which serve to provide the bearing regions in the bearing bush 12 with lubricant. One of the universal joints 3 is additionally used for lubricating the centering devices 23, 25. For this purpose, the cross member 11, towards the bridge 26, is provided with a threaded bore 19. The threaded bore 19 is in communication with the lubricating channels 17, and is arranged in the center of the cross member 11. A flexible hose 20 having an attachment 22 is inserted into the threaded bore 19, and extends into a lubricating channel 27 which in turn extends through the bridge 26 and ends in the sleeve bore 24. The lubricating channel 27 is arranged on the axis 16 of the respective outer yoke 3. In the direction of the cross member 11, the lubricating channel 27 comprises a conical expansion 28 which has rounded transitions. The hose 20 has a channel 21 via which the lubricating channels 17 of the cross member 11 are connected to the sleeve bore 24.

Upon articulation of the double joint 1, the hose 20 is deformed as illustrated in FIG. 2. The conical expansion 28 ensures that the hose 20 is not bent. Upon articulation, the hose in the lubricating channel is displaced in accordance with the change in position and length of the threaded bore 19 in the cross member 11 resulting from the articulation of the joint. Upon lubrication via the lubricating nipple 18, the lubricant passes through the lubricating channels 17 in the cross member 11 and the threaded bore 19 into the channel 21 of the hose 20. The diameter of the channel 21 is so accurate that simultaneous lubrication through the channel 21 into the region of the sliding faces of the two centering devices 23, 25 to be lubricated and especially of the spherical outer face of the journal 25 and the wall of the sleeve bore 24, may take place. In this way, a closed system is produced.

Figure 4:
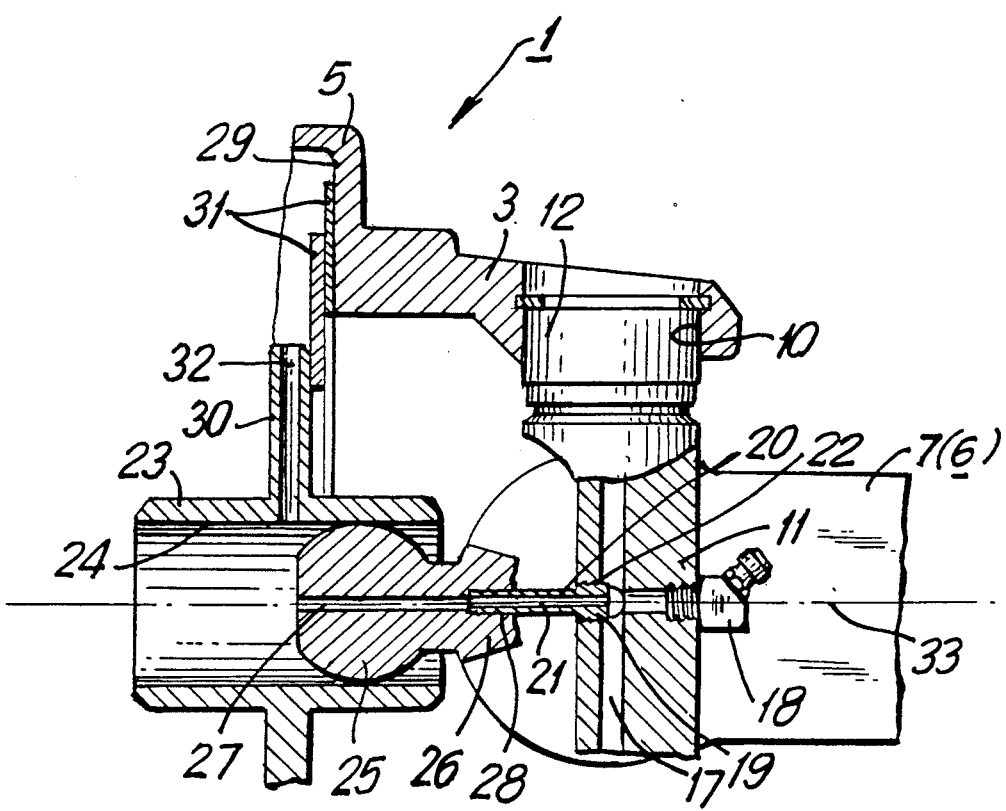
FIG. 4 shows part of a modified double joint having the lubricating facility in accordance with the invention.

In the embodiment of a double joint 1 as illustrated in FIG. 4, the journal 25 is associated with the outer yoke 6 of the universal joint 3 via a bridge 26. The centering sleeve 23, via a guiding disc 30, is radially movably arranged in a recess 29 of the connecting flange 5. In the guiding disc 30, there is provided at least one radially extending channel 32 ending in the bore 24 of the centering sleeve 23. In this way it is possible to simultaneously to lubricate the sliding region of the guiding disc 30 and of the sliding discs 31. In this case the centering journal 25 is provided with a lubricating channel 27 which is arranged so as to extend on the axis 33 of the outer yoke 6 of the universal joint 3 and into which the hose 20 projects. This arrangement and design of the hose 20 relative to the cross member 11 or the bridge 26 correspond to the embodiment as shown in FIGS. 1 to 3. The two double joints merely differ in respect of the kind of centering in the region of the connecting flange 5.

The lubricating nipple 18 may be arranged in two ways, with one such lubricating nipple arrangement being shown in FIGS. 1 and 2, in which the lubricating nipple 18 is associated with a bearing bush 12. In the second case, the lubricating nipple 18, as illustrated in FIG. 4, is arranged so as to be positioned directly opposite the hose 20 at the cross member 11. This has the advantage that the lubricating nipple arrangement normally provided for universal joints, merely by continuing the necessary central bore, may be used for attaching the hose 20.

While the invention has been illustrated and described as embodied in a centered double joint with lubrication, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

1. A centered double joint, comprising two universal joints each having an inner yoke and an outer yoke and a cross member which connects the two and which, via bearings, is held in bores of the yokes, the two inner yokes being connected to each other, and the two outer yokes, via engaging centering devices centrically attached to a bridge connecting their yoke arms, being guided either directly relative to each other or by inserting a guiding disc radially movable between the inner yokes, one of the centering devices being a sleeve and the other being a spherical journal guided therein, one centering device associated with the respective bridge having a lubricating channel which for lubricating purposes is connected to lubricating channels of the cross member, wherein at least one of the two cross members (11) has a centrically arranged bore (19) which opens towards the bridge (26) and which is connected to the lubricating channels (17) of the cross member (11), the bridge (26) and the centering device (23 or 25) connected thereto are provided with a continuous lubricating channel (27) arranged so as to extend on the axis of rotation (33) of a respective outer yoke (6), and the lubricating channel (27) being connected to the bore (19) of the cross member (11) by a flexible hose (20).

2. A double joint according to claim 1, wherein the bore (19) is threaded, the hose (20) being provided with a threaded attachment (22) screwed into the threaded bore (19) of the cross member (11).

3. A double joint according to claim 1, wherein the hose (20) is provided with a cylindrical attachment (22) which is pressed into the bore (19) of the cross member (11).

4. A double joint according to claim 3, wherein the bore (19) is threaded.

5. A double joint according to claim 1, wherein the hose (20) extends into the lubricating channel (27) of the bridge (26) and the lubricating channel (27) is conically extended in the direction of the cross member (11).

6. A double joint according to claim 1, wherein the hose (20) is axially movable in the lubricating channel (27) of the centering device (23, 25), and the hose being expandable by pressure of a lubricating agent during lubrication so that it rests outwardly sealingly against the lubricating channel (27).

* * * * *